United States Patent [19]

Chase et al.

[11] Patent Number: 5,617,734
[45] Date of Patent: Apr. 8, 1997

[54] LOW TEMPERATURE COMPOSITION PREPARATION DEVICE, AND METHODS OF CONSTRUCTING AND UTILIZING SAME

[75] Inventors: Thomas W. Chase, Alton, N.H.; Richard C. Pahl; Gregory J. Walsh, both of Essex Junction, Vt.

[73] Assignee: Island Delite, Ltd., Essex Junction, Vt.

[21] Appl. No.: 410,967

[22] Filed: Mar. 27, 1995

[51] Int. Cl.$^6$ .................................... A23G 9/12
[52] U.S. Cl. ............................. 62/343; 366/288
[58] Field of Search ............................ 62/342, 343, 525, 62/527; 366/288; 165/139, 154, 94

[56] References Cited

U.S. PATENT DOCUMENTS

| | | |
|---|---|---|
| Re. 27,019 | 1/1971 | Harker . |
| D. 256,124 | 7/1980 | Adamson et al. . |
| 1,880,731 | 10/1932 | Boileau ........................ 366/288 |
| 1,942,696 | 1/1934 | Helwege . |
| 2,005,937 | 6/1935 | Dennison . |
| 2,148,414 | 2/1939 | Wolfert et al. ................ 62/525 |
| 2,243,317 | 5/1941 | Phelan .......................... 366/288 |
| 2,718,123 | 9/1955 | Braswell, Jr. ................. 62/525 |
| 3,298,190 | 1/1967 | Harker . |
| 3,519,910 | 7/1970 | Pfaff et al. . |
| 3,600,657 | 8/1971 | Pfaff et al. . |
| 3,729,177 | 4/1973 | Keyes et al. . |
| 3,787,145 | 1/1974 | Keyes et al. . |
| 3,868,050 | 2/1975 | Gorychka et al. . |
| 3,898,866 | 8/1975 | Keyes et al. . |
| 3,934,427 | 1/1976 | Keyes . |
| 3,965,807 | 6/1976 | Baker . |
| 3,987,718 | 10/1976 | Lang-Ree et al. . |
| 3,989,492 | 11/1976 | Keyes . |
| 3,995,770 | 12/1976 | Schwitters . |
| 4,052,180 | 10/1977 | Erickson ........................ 62/342 |
| 4,201,558 | 5/1980 | Schwitters et al. . |
| 4,203,461 | 5/1980 | Schwitters . |
| 4,275,567 | 6/1981 | Schwitters . |
| 4,277,953 | 7/1981 | Kramer .......................... 62/525 |
| 4,327,845 | 5/1982 | Keyes et al. . |
| 4,345,514 | 8/1982 | Morley . |
| 4,364,491 | 12/1982 | Adamson . |
| 4,364,666 | 12/1982 | Keyes . |
| 4,390,760 | 6/1983 | Schwitters . |
| 4,393,659 | 7/1983 | Keyes et al. . |
| 4,444,094 | 4/1984 | Baker et al. . |
| 4,461,405 | 7/1984 | Adamson . |
| 4,479,423 | 10/1984 | Schwitters et al. . |
| 4,544,085 | 10/1985 | Frazer . |
| 4,567,819 | 2/1986 | Adamson . |
| 4,580,905 | 4/1986 | Schwitters et al. . |
| 4,732,013 | 3/1988 | Beck . |
| 4,878,760 | 11/1989 | Newton et al. . |
| 5,205,129 | 4/1993 | Wright et al. . |
| 5,302,020 | 4/1994 | Kruse ............................ 366/288 |
| 5,341,656 | 8/1994 | Rust, Jr. et al. ............. 62/525 |
| 5,433,524 | 7/1995 | Wuster ........................... 366/288 |

*Primary Examiner*—William E. Tapolcai
*Attorney, Agent, or Firm*—Weiner, Carrier & Burt, P.C.; William F. Esser; Irving M. Weiner

[57] ABSTRACT

A device for mixing or otherwise processing compositions at preselected temperatures, comprising a container for receiving the composition ingredients; a jacket member disposed about the container at a spaced distance therefrom so as to form a substantially sealed area therebetween; a unit for introducing fluid flow through the area defined by the relationship between the jacket member and the container; a unit for selecting the temperature of the fluid introduced into the area; and wherein the jacket member includes a plurality of inlet ports disposed substantially evenly about an end portion of the jacket member for receiving the fluid which is introduced into the defined area, so as to maintain the container at a substantially uniform temperature.

10 Claims, 11 Drawing Sheets

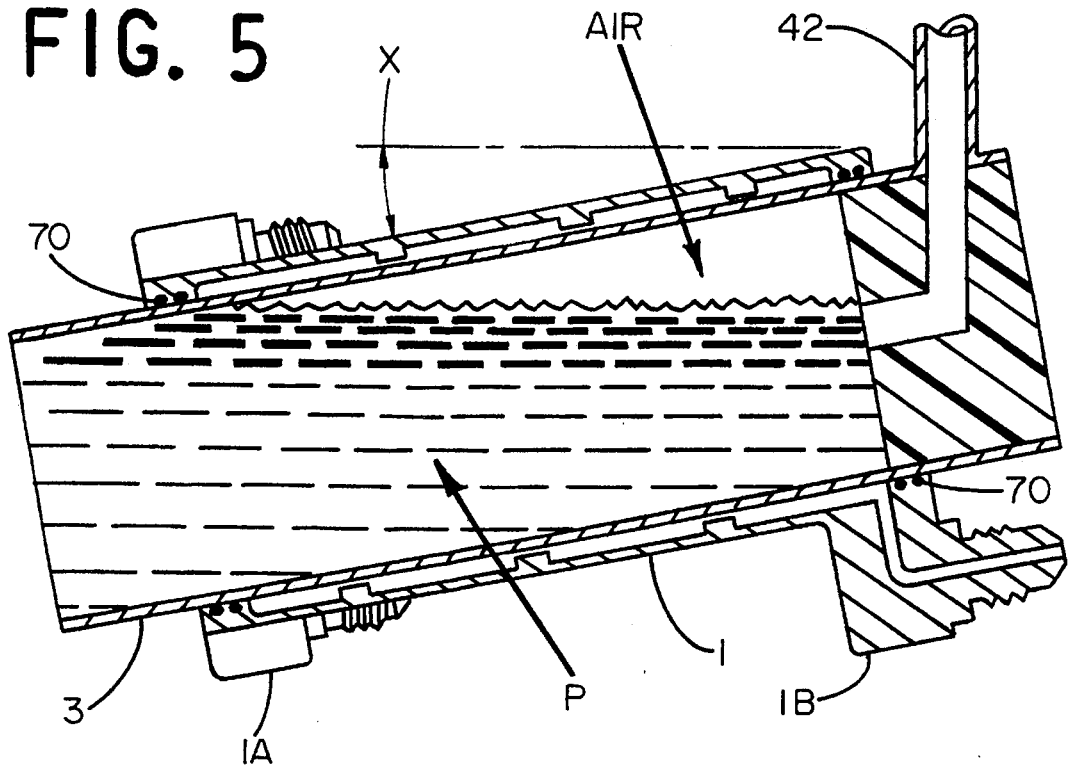
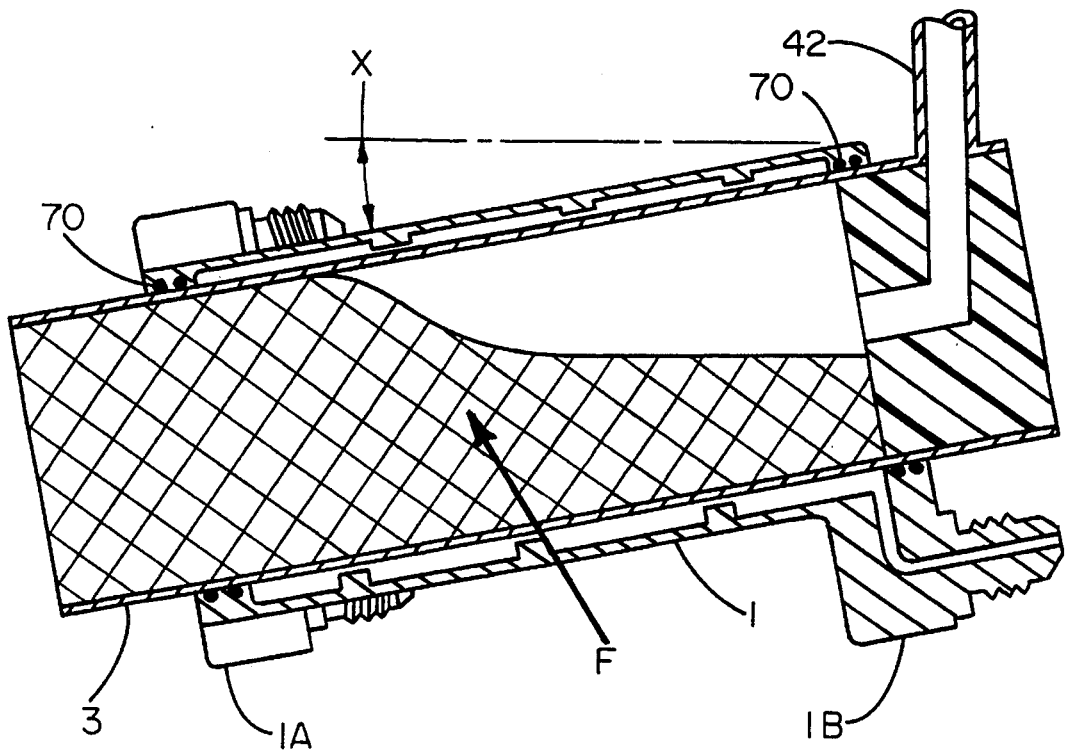

EVAPORATOR BTU TEST (TREND)
BASED ON 1 LB OF WATER

CODE:
X FULL COIL WRAPPED, HEAT SINKED W/EXPANSION VALVE
● WET JACKET, W/4 BC3 TUBES

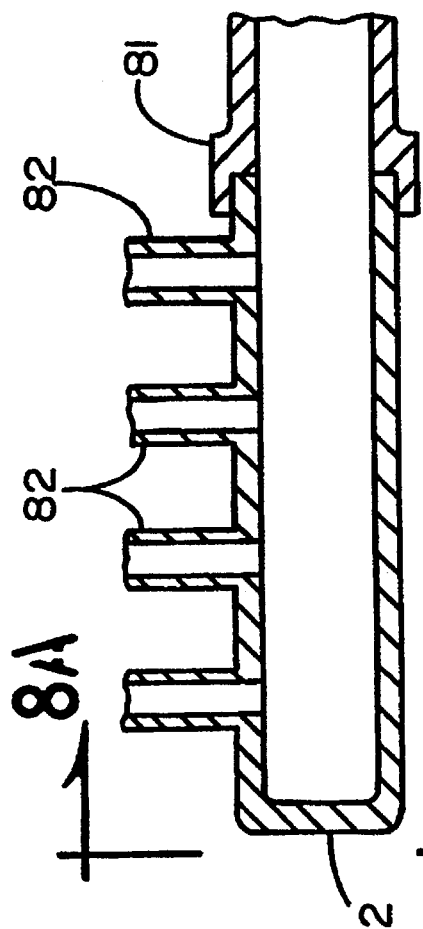
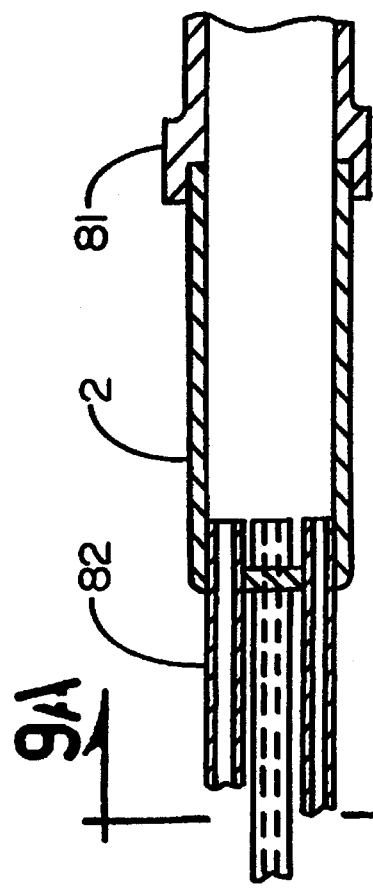
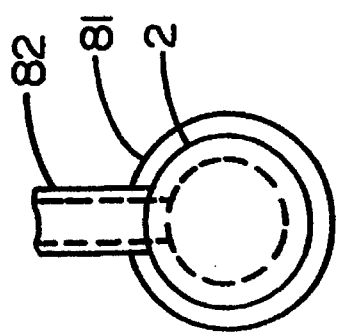
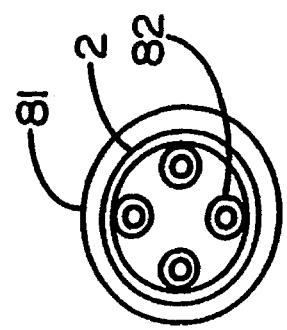

LOW TEMPERATURE COMPOSITION PREPARATION DEVICE, AND METHODS OF CONSTRUCTING AND UTILIZING SAME

BACKGROUND OF THE INVENTION

1. Field of Invention

This invention relates to a device for preparing a composition at preselected temperatures, and specifically to a semi-frozen food preparation apparatus for preparing and dispensing soft-serve ice cream or similar foods.

2. Description of the Relevant Art

There are known soft-serve ice cream machines. For example, Helwege U.S. Pat. No. 1,942,696 discloses an ice cream freezer wherein brine liquid flows downwardly, by gravitational means, along the inner sides thereof so as to maintain freezing conditions of the freezer. Helwege, however, fails to disclose a device which maintains substantially uniform temperatures along the surface of the container unit, or a device which is easily cleaned.

Harker U.S. Re. Pat. No. 27,019 and U.S. Pat. No. 3,298,190 disclose a frozen confection machine having internal sensing mechanisms, but fail to disclose a device having means for thoroughly mixing compositions throughout the container, for providing a substantially uniform temperature thereto, for easily draining and cleaning the container, or for substantially completely scraping compositions from the inner surface of the container.

Beck U.S. Pat. No. 4,732,013 discloses a freezer having a helical scraper. Beck, however, fails to disclose a device having means for mixing and/or aerating a composition located in a central portion of the container, means for efficiently pushing the composition towards the dispensing port as it is being mixed, or means for maintaining the container in a substantially uniform temperature.

Keyes U.S. Pat. Nos. 3,729,177 and 3,898,866 disclose a pump and cleaning apparatus for frozen confection food machines, but fail to disclose a confection food apparatus having means for efficiently mixing and aerating confection compositions, scraping confection compositions from the inner container surface, or urging compositions towards a discharge port.

Wright U.S. Pat. No. 5,205,129 discloses an apparatus having dual freezing chambers operated from a single motor, and having temperature sensors located within each chamber.

SUMMARY OF THE INVENTION

The present invention overcomes the above discussed limitations and shortcomings of known composition processing devices, and satisfies a significant need for such a device which thoroughly mixes, aerates, and effectively discharges a confection at cooled, preselected temperatures, and thoroughly cleans the device when not in use.

According to the present invention, there is provided a composition preparation and dispensing device, such as a soft serve ice cream machine, comprising a container for receiving the composition ingredients, having a inlet port and an outlet port located at opposite ends thereof; a jacket member which is disposed about the container so that a substantially sealed area is formed therebetween; a unit for providing a refrigerant fluid to flow through the area defined between the container and jacket member; a unit for cooling the refrigerant fluid flowing between the container and the jacket member so as to maintain the container surface at a substantially uniform, preselected temperature; controls for selecting the container temperature; an auger member for scraping the composition from the inner surface of the container at substantially all points thereon, mixing and aerating the composition throughout the container, and urging the composition towards a dispensing unit; and wherein the container is disposed within the device at an angle relative to a horizontal axis so as to effectively push the composition forwardly towards the dispensing unit so that the mixed product is effectively combined with newly added composition ingredients.

In use, as the composition or confection ingredients such liquid and granular compounds are added to the container unit via the inlet port thereof, the cooling unit and the fluid flow providing unit introduce flow of refrigerant in direct contact with the outer surface of the container substantially evenly so as to maintain the temperature of the container surface at a substantially uniform temperature which is preselected by setting the temperature control. The ingredients are thoroughly mixed and aerated by imparting planetary motion to the auger member, which urges the mixture towards the container wall for cooling, scrapes it therefrom, and urges the mixture towards the outlet port for dispensing.

Upon dispensing the mixed product, the device is cleaned by adding a substantially liquid cleaning product to the container via the inlet port, operating the auger member so as to thoroughly splash the cleaner against substantially all portions of the container, and draining the cleaner therefrom using the outlet port.

It is an object of the invention to provide a device for mixing articles therein at substantially uniform, preselected temperatures.

It is another object of the invention to provide a device which quickly and efficiently reaches a preselected temperature.

Another object of the invention is to provide such a device which thoroughly mixes, aerates, and cools the composition therein.

A further object of the invention is to provide a device which is easily and quickly cleaned.

Other objects, advantages and salient features of the present invention will become apparent from the following detailed description, which, when taken in conjunction with the annexed drawings, discloses preferred embodiments of the present invention.

BRIEF DESCRIPTION OF THE DRAWINGS

FIG. 5 is a cross sectional view the device of FIG. 4 showing an air/product ratio therewithin.

FIG. 6 is a cross sectional view of the device in FIG. 4 showing a temperature line therein.

FIG. 8 is a cross sectional view of a manifold member of the present invention.

FIG. 8a is a cross sectional view of the manifold of FIG. 8 taken along the 8a—8a line therein.

FIG. 9 is a cross sectional view of a second manifold member of the present invention.

FIG. 9a is a cross sectional view of the manifold of FIG. 9 taken along the 9a—9a line therein.

DETAILED DESCRIPTION OF THE INVENTION

Figure 1:
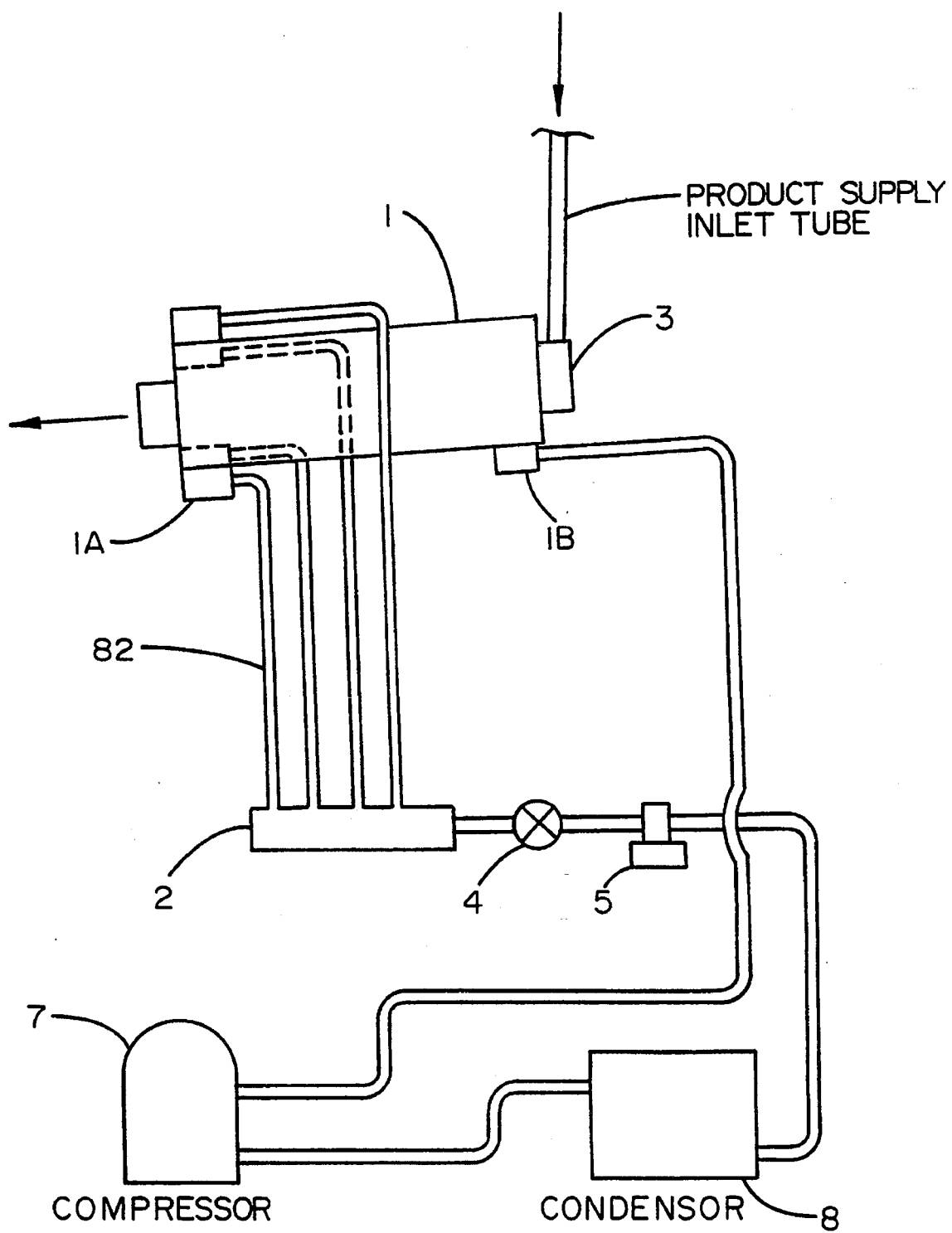
FIG. 1 is a block diagram illustrating a preferred embodiment of the present invention.
Figure 2:
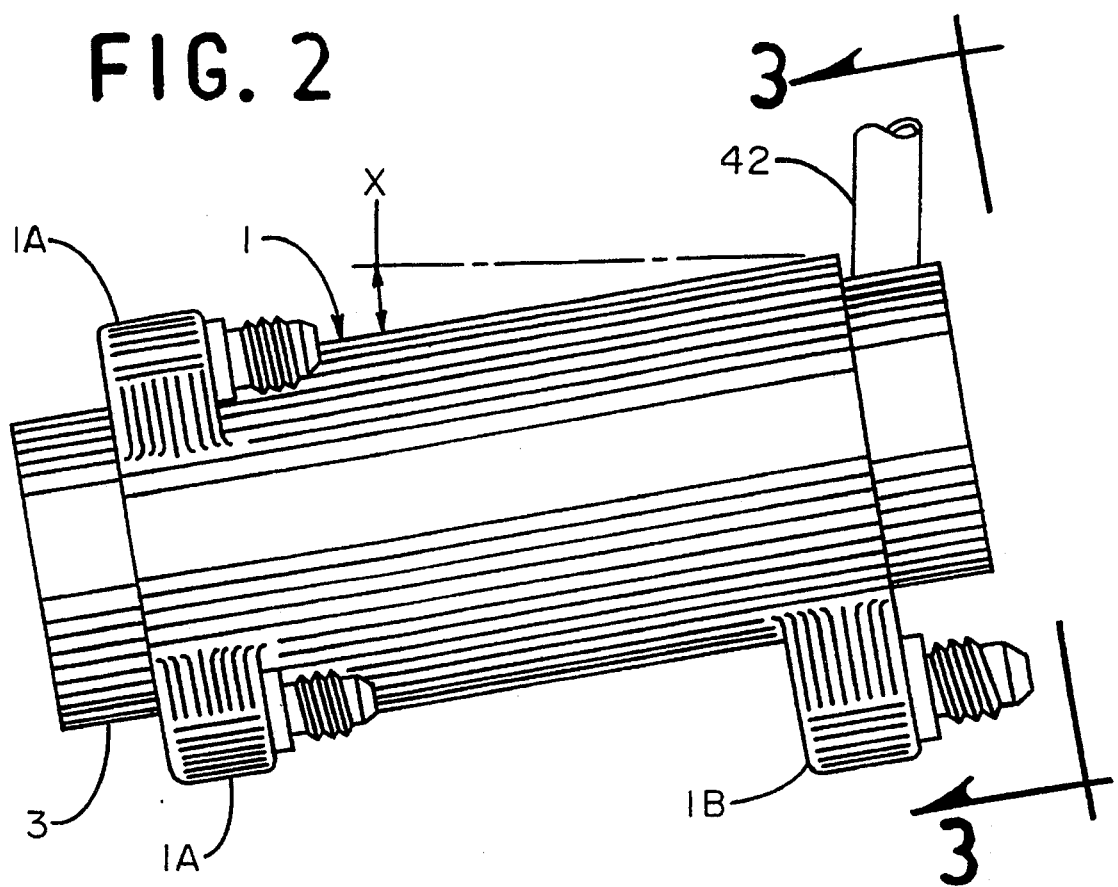
FIG. 2 is a side elevational view of a jacket member-container member of a preferred embodiment of the present invention.

Referring to FIGS. 1–17, there is shown a device for preparing and dispensing a composition at a desired temperature, comprising jacket member 1; product tube container 3, which is positioned within jacket member 1 and connected thereto so as to form a substantially sealed area therebetween; manifold 2, one end of which is connected to jacket member 1 at a plurality of locations therealong; condenser 8, which is connected to a second end of manifold 2 via valve 5 and pressure control device 4; compressor 7, which is operably connected to condenser 8 so as to provide a fluid, such as a refrigerant, under pressure to jacket member 1; and auger member 40. Condenser 8 and compressor 7 are adapted to cooperate with jacket member 1 so as to introduce fluid flow through the area between product tube 3 and jacket member 1 so as to maintain product tube 3 at a substantially uniform, preselected temperature by directly contacting the outer surface thereof with refrigerant.

The device may be used in a wide variety of applications in which powdered, liquid and/or semi-liquid compositions are mixed, aerated and/or prepared at any of a wide range of temperatures, including but not necessarily limited to soft serve ice cream machines, chemical mixing machines, milk shake or other beverage machines, and cheese processing machines.

Product tube container 3 preferably substantially retains the composition to be mixed, aerated, or otherwise worked. In a preferred embodiment, product tube 3 is substantially cylindrical and includes an inlet port disposed at a first end thereof for inputting confection ingredients into product tube 3 to be worked, and an outlet port disposed at an end opposite the first end for dispensing the mixed or worked composition from product tube 3. In a preferred embodiment, the cylindrical surface of product tube 3 is thermally conductive and substantially smooth so that articles received therein can be worked or processed at any of a variety of selected temperatures. Product tube 3 preferably but not necessarily is constructed from stainless steel and is sized depending upon the desired application.

As shown in FIGS. 1 and 4–6, the inlet port of product tube 3 is connected to product supply inlet tube 42 so as to provide direct access to the inside of product tube 3. The diameter of product supply inlet tube 42 and the location in which it is connected along the first end of product tube 3 vary depending upon application.

As shown in FIGS. 2–6, preferred embodiments of the present invention include jacket member 1, which is preferably but not necessarily substantially disposed around product tube 3 so as to form sealed area A therebetween. In a preferred embodiment, jacket member 1 is integrally formed with product tube 3 so as to form a unitary member. Alternatively, jacket member 1 is substantially sealed to product tube 3 by the use of grooves located therein for positioning gaskets, O-rings 70 or other sealing devices therebetween.

Jacket member 1 is preferably but not necessarily comprised from a rigid material such as metal, extruded plastic, or synthetic resin, and is thermally insulative to as to efficiently maintain product tube 3 at the desired temperature. In applications in which the time necessary for product tube 3 to reach the preselected temperature is critical, jacket member 1 is preferably but not necessarily comprised from carbon fiber or similar compositions.

Figure 3:
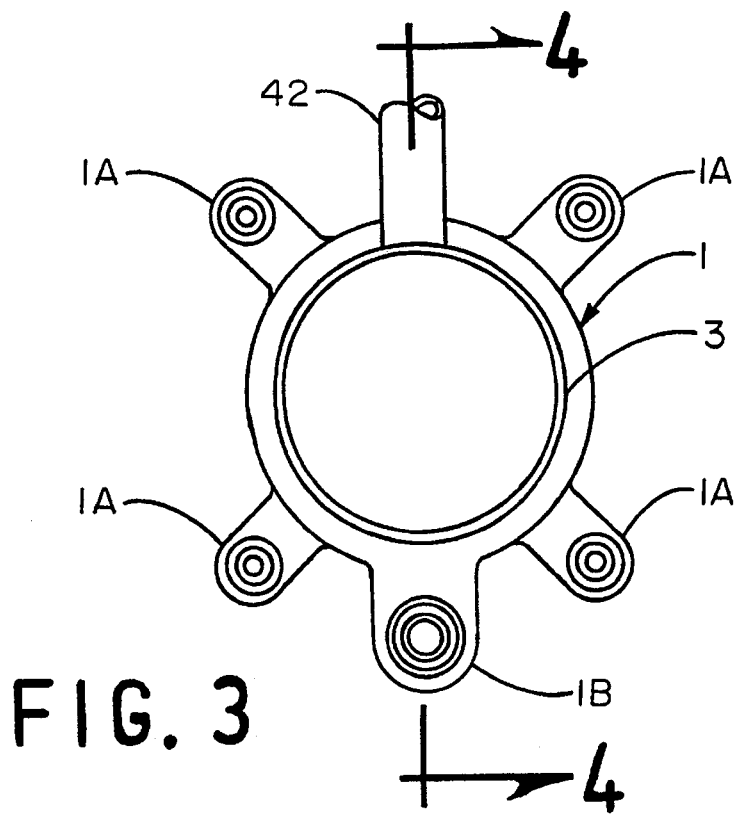
FIG. 3 is an internal cross sectional view taken along the 3—3 line of FIG. 2.
Figure 4:
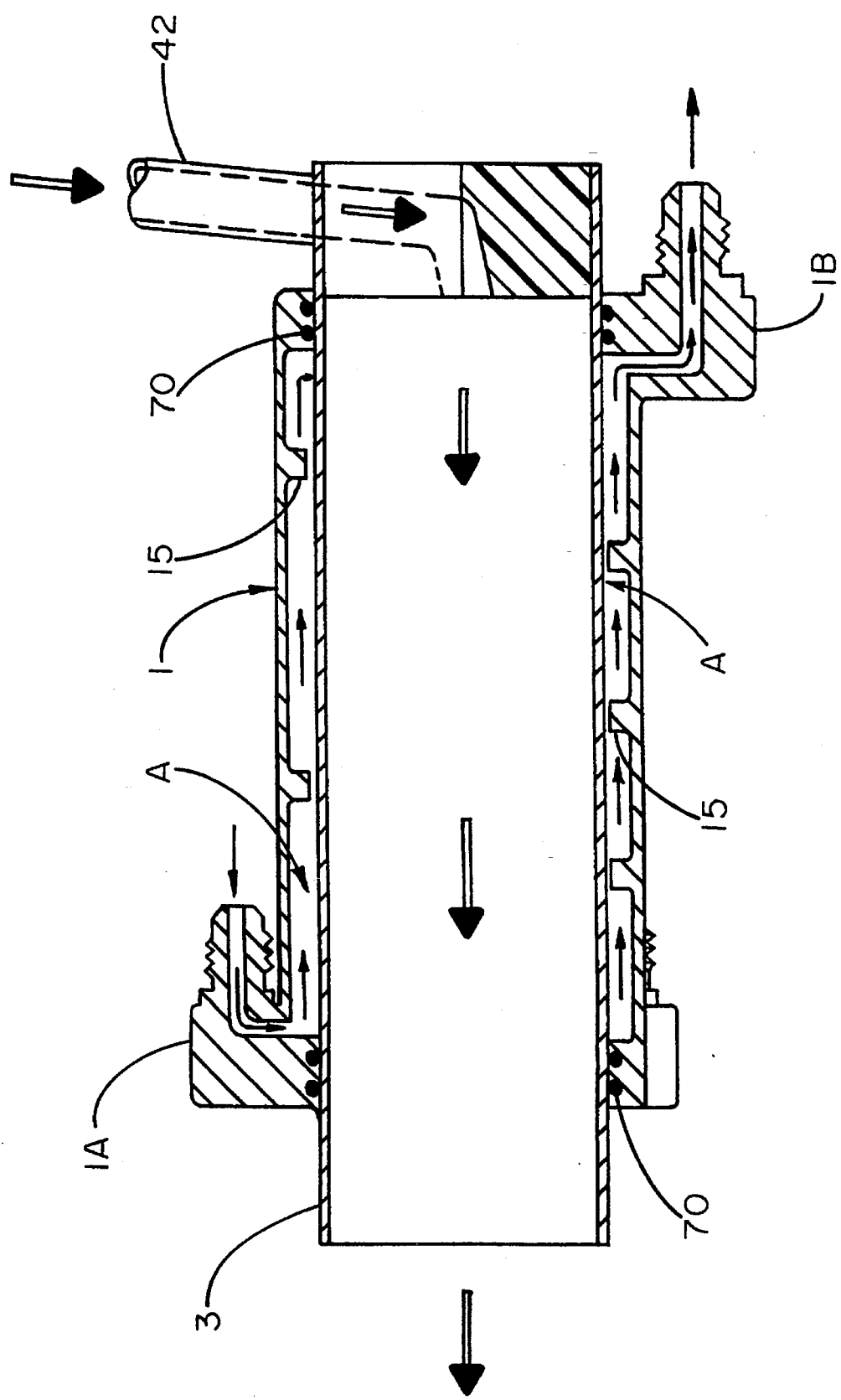
FIG. 4 is a cross sectional view of the jacket member and product tube of the present invention taken along the 4—4 line of FIG. 3.
Figure 7:
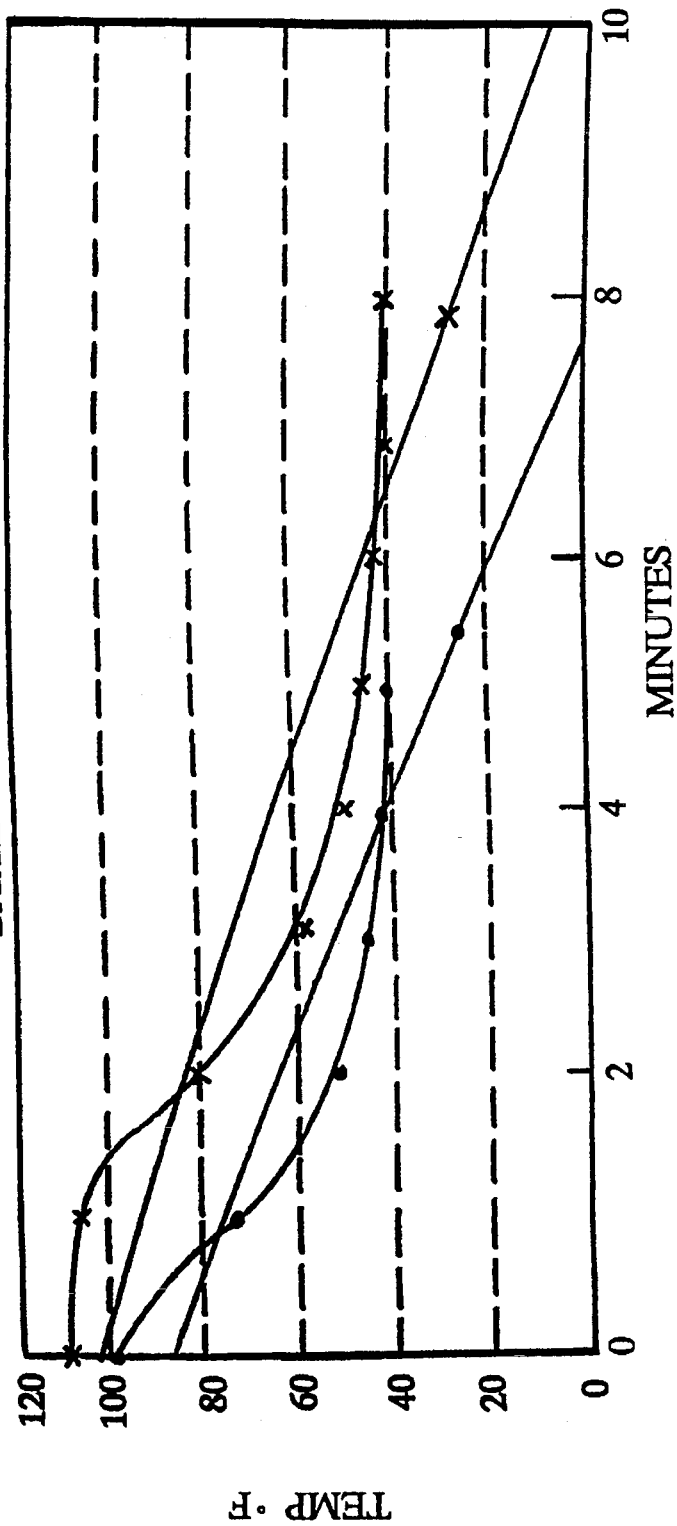
FIG. 7 is a graph illustrating the cooling efficiency of an embodiment of the present invention.

Jacket member 1 further includes a plurality of inlet ports 1A for directing fluid flow, such as refrigerant fluid, from condenser 8 and compressor 7 substantially evenly through area A, as shown in FIGS. 3 and 4. Inlet ports 1A are preferably but not necessarily substantially evenly disposed about one end of jacket member 1 along the outer surface thereof, as shown in FIG. 3. The purpose of having a plurality of inlet ports 1A evenly disposed about one end of jacket member 1 is to introduce fluid flow, such as a refrigerant, through area A under pressure so as to directly contact and thereby maintain product tube 3 at a substantially uniform temperature. Such substantially uniform temperature characteristic is a significant improvement over the use of coils or other similar temperature transfer techniques (i.e., heat sinking techniques) wherein noticeable temperature variations and low efficiency (50%) exist along a product tube between surface portions which contact or are adjacent the coils and surface portions which are not.

The exact number of inlet ports 1A may vary depending upon, among other things, the diameter and length of product tube 3 and/or jacket member 1, the diameter of each inlet port 1A, the characteristics of condenser 8 and compressor 7, the extent of desired temperature uniformity across the surface of product tube 3, the thermal characteristics of product tube 3 and jacket member 1, and the desired temperature range in which compositions are to be worked. Jacket member 1 preferably but not necessarily includes one outlet port 1B, but alternatively jacket member 1 includes a plurality of outlet ports 1B.

As shown in FIG. 4, jacket member 1 preferably but not necessarily includes ducting 15 disposed along an inner surface or jacket member 1. Ducting 15 provides direction or control of refrigerant flowing through area A from inlet ports 1A to outlet port 1B by creating flow turbulence, enhancing flow density, and limiting flow in desired areas within area A. Ducting 15 preferably but not necessarily includes both protrusions extending inwardly from an inner surface of jacket member 1 and grooving disposed therealong.

In a preferred embodiment, the connection to inlet ports 1A preferably but not necessary includes fittings for a flared, compression, interlocked, or direct connection. Alternatively, inlet ports 1A and outlet port 1B are integrally forged or machine cast with jacket member 1 so as to form a unitary member.

Figure 10:
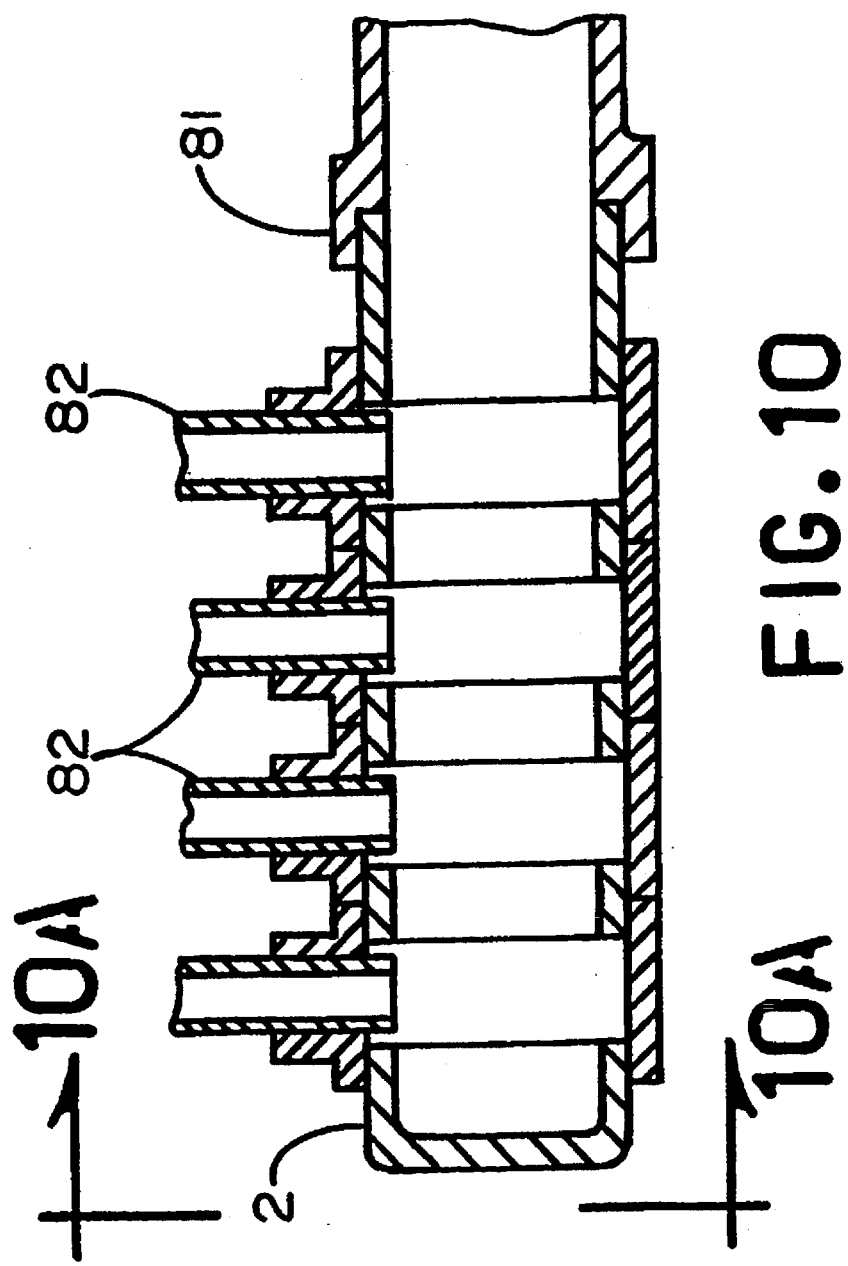
FIG. 10 is a cross sectional view of another manifold member of the present invention.

The present invention additionally includes means, connected between condenser 8 and jacket member 1, for substantially evenly distributing fluid, such as a refrigerant, to jacket member 1 so as to maintain product tube 3 at a desired temperature. As shown in FIG. 1, such fluid providing means comprises manifold 2. Manifold 2 is adapted to substantially evenly distribute fluids flowing from condenser 8 to each inlet port 1A of jacket member 1. Referring to FIGS. 8–10, manifold 2 comprises high pressure fluid supply port 81, which is connected the output of condenser 8 for receiving fluids under pressure; and a plurality of distribution tubes 82, each of which connects to a separate inlet port 1A so as to provide fluid communication between condenser 8 and jacket member 1. Manifold 2 is preferably formed as a unitary member by solid cast brazing or otherwise attaching distribution tubes 82 thereto, and requires little servicing because there are no moving parts. As a result, the only substantial testing necessary is in performing a pressure test on manifold 2 prior to installation so as to detect any leakages therein. Manifold 2 is preferably but not necessarily thermally insulative and located substantially proximally to jacket member 1.

Figure 10A:
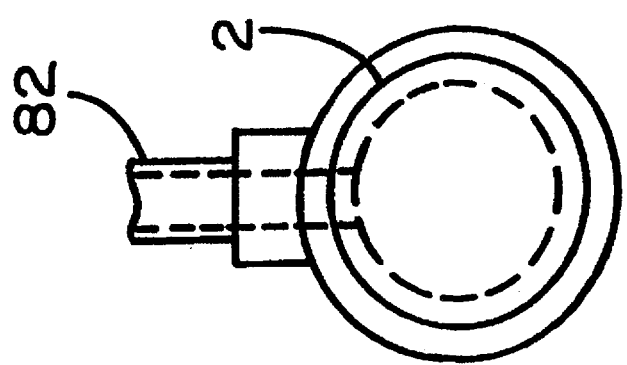
FIG. 10a is a cross sectional view of the manifold of FIG. 10 taken along the 10a—10a line therein.
Figure 12:
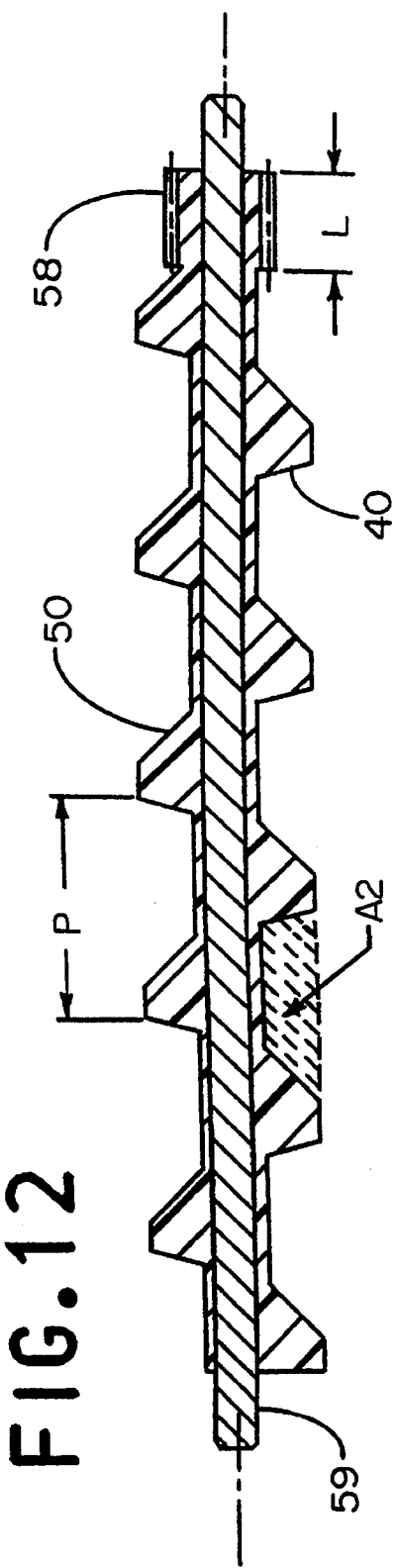
FIG. 12 is a cross sectional view of the auger member of FIG. 14 taken along the 12—12 line therein.

In a preferred embodiment, distribution tubes 82 are disposed along a side portion of manifold 2, as shown in FIGS. 8 and 8A. Alternatively, distribution tubes 82 are disposed about an end portion of manifold 2 (FIGS. 9 and 9A). In a third embodiment, manifold 9 is constructed by attaching a plurality of "tee" fittings together by direct, flared, or compression connections, or by a fitting having an interlocking attachment means (FIGS. 10 and 10A).

Actual sizes of distribution tubes 82 and fluid supply port 81 vary depending upon the application of the present invention. In relative terms, the combined cross-sectional areas of all distribution tubes 82 are preferably equal to or less than the internal cross-sectional area of the main body of manifold 2.

Experiments were conducted comparing the performance of jacket member 1, product tube 3, and manifold 2 to the performance of product tube 3 having conventional coiled cooling means, using identically sized condensers and compressors, and compositions under test in identical amounts. The experimental results are graphically represented in FIG. 7, which show the significant reduction in time necessary to cool the tested composition, in this case water, to near freezing temperatures.

Experiments further revealed that the above-described direct contact cooling system provides a significant improvement in efficiency over conventional coil-cooled systems by over 40% (approximately 90% efficiency for the direct contact system compared to only approximately 50% efficiency for conventional systems).

As a result of the increase in efficiency in cooling compositions within product tube 3 by the combination of jacket member 1, product tube 3 and manifold 2, condenser 8 and compressor 7 can each function at reduced performance levels compared to condensers and compressors that are associated with identically sized product tubes in conventional coil-cooled machines, while still maintaining device cooling performance levels comparable therewith. Because compressors 7 and condensers 8 having lowered performance levels are physically smaller than other compressors and condensers having higher performance characteristics, one preferred embodiment of the invention comprises a countertop or substantially portable device for preparing and dispensing confections such as soft serve ice cream. Soft serve ice cream machines which are sized for tabletop or portable use are not known in the industry.

The above-described direct cooling system provides other advantages over conventional coil-cooled devices. By way of one example, the direct contact cooling system are less expensive to manufacture in part because components such as reservoirs, accumulators, or expansion valves which are found in conventional devices are not necessarily needed.

In a preferred embodiment of the present invention, product tube 3 and jacket member I are disposed within the device so as to be angularly positioned relative to a horizontal axis. As shown in FIGS. 5 and 6, product tube 3 and jacket member 1 are positioned on an incline so that a product worked within product tube 3 is concentrated towards the dispensing end thereof. Such forwardly concentration of a product within product tube 3 accomplishes a number of objectives.

First, the angled position of product tube 3 allows the final product or cleaning products which are introduced to product tube 3 from product supply line 42 to easily and substantially completely drain from product tube 3 via the device dispensing nozzle located at the opposite end of product tube 3. Such products can be effectively drained even in the event of a electrical power failure.

Secondly, with the mixed product within product tube 3 flowing substantially forwardly towards the dispensing end thereof, unmixed products or ingredients can enter product tube 3 from product supply line 42 without having to substantially urge the mixed product forwardly by pressure means.

Third, in the event the performance characteristics of compressor 7 and condenser 8 are such that a slight deviation in temperature exists along product tube 3, or if product tube 3 is cooled by a coil, the surface area of product tube 3 having the coldest temperature (based upon the inlet ports 1A of jacket member 1 being located at the dispensing end of product tube 3, as shown in FIGS. 5 and 6) is substantially located at the forward or dispensing end thereof, substantially precisely where the product is concentrated when product tube is positioned at an angle from the horizontal. FIG. 6 illustrates such a situation by showing a measured "frost area" wherein the area within product tube 3 identified by the cross-hatched diagonal lines is maintained at a substantially freezing temperature, while the area occupying the uppermost portion of product tube 3 nearest product tube supply line 42 is at a temperature slightly above the substantially freezing temperature. By substantially concentrating products within product tube 3 substantially within the "frost area" or the area of product tube 3 having the coldest temperature, the device is most efficiently operated.

Tests have shown that by positioning product tube 3 at an angle approximately between 3° and 5° from the horizontal, the concentration of a product therein is substantially concentrated in the area of product tube 3 having the coldest temperature, thereby providing substantially optimal cooling. This is illustrated in FIG. 5, wherein product P is concentrated within product tube 3 which is positioned at angle X being between approximately 3° and 5° from the horizontal. As can be seen by comparing the concentration of product P in FIG. 5 to the measured "frost area" in FIG. 6, product P is substantially disposed within the coldest area of product tube 3, thereby ensuring that product P is best maintained at the desired temperature.

The angled position of product tube 3 and jacket member 1 also allows for quick, thorough and efficient mixing of recently added ingredients with an already mixed product in product tube 3, in contrast to conventional devices in which the recently added ingredients at times fail to thoroughly mix with the already mixed product.

A preferred embodiment of the present invention preferably but not necessarily includes a means for thoroughly mixing, aerating and/or beating a confection within product tube 3 so that the resulting worked product, such as a semi-frozen food confection, has a foam-like characteristic, by being mixed with air located in product tube 3. The mixing/aerating means preferably but not necessarily comprises auger member 40 disposed substantially within product tube 3, and means for providing substantially planetary motion to auger member 40 relative to a longitudinal axis of product tube 3.

Figure 11:
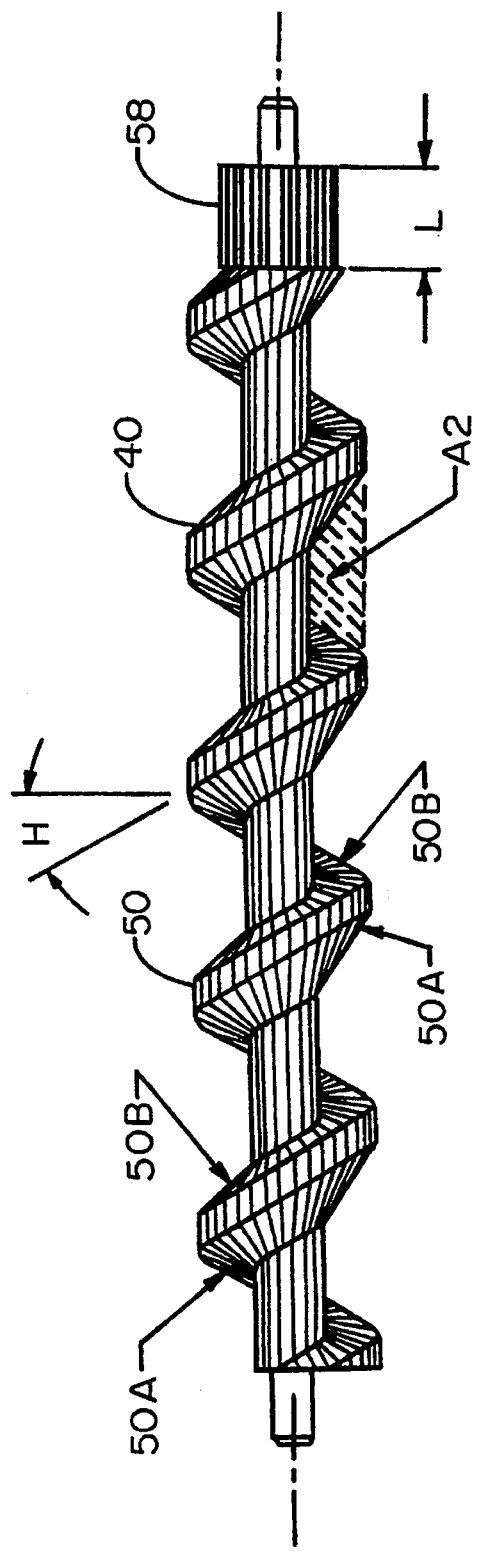
FIG. 11 is an elevational view of an auger member of a preferred embodiment of the present invention.

Auger member 40 preferably includes a substantially helical auger blade 50 extending outwardly from auger shaft 59. Auger blade 50 includes a sloped leading edge 50A and an oppositely sloped trailing edge 50B, as shown in FIG. 11. When auger 40 is rotating about its longitudinal axis, such sloped or tapered edges of auger blade 50 substantially push the composition to be mixed substantially outwardly towards the wall of product tube 3 and forwardly towards the dispensing end thereof, thereby allowing the composition to cool and/or freeze more quickly as well as to substantially thoroughly mix and/or aerate the composition. The surfaces of auger blade 50 are preferably but not necessarily substantially smooth, thus allowing compositions to more easily slide therefrom when in operation. This method of processing results in a significant reduction in processing time.

Further, auger member 40 is preferably but not necessarily constructed from extruded plastic. Alternatively, auger member 40 includes a rod or central portion constructed from rigid stainless steel which may provide for shortened shafting at both ends of auger member 40.

The pitch P of auger blade 50 (FIG. 12), which determines helix angle H of auger blade 50 preferably varies depending upon the application of the device. Helix angle H determines the amount of thrust which urges the composition from the rearward (product input) end of product tube 3 to the forward (dispensing) end thereof. Pitch P of auger blade 50 also partially defines area A2 (FIG. 11) which is the area wherein a product and/or composition is worked (forwardly and outwardly directed forces acting thereon) by auger blade 50.

By way of one example, for an auger member 40 being 9" in length, there are approximately 5 pitches P resulting in a helix angle H of approximately 30°.

Figure 17:
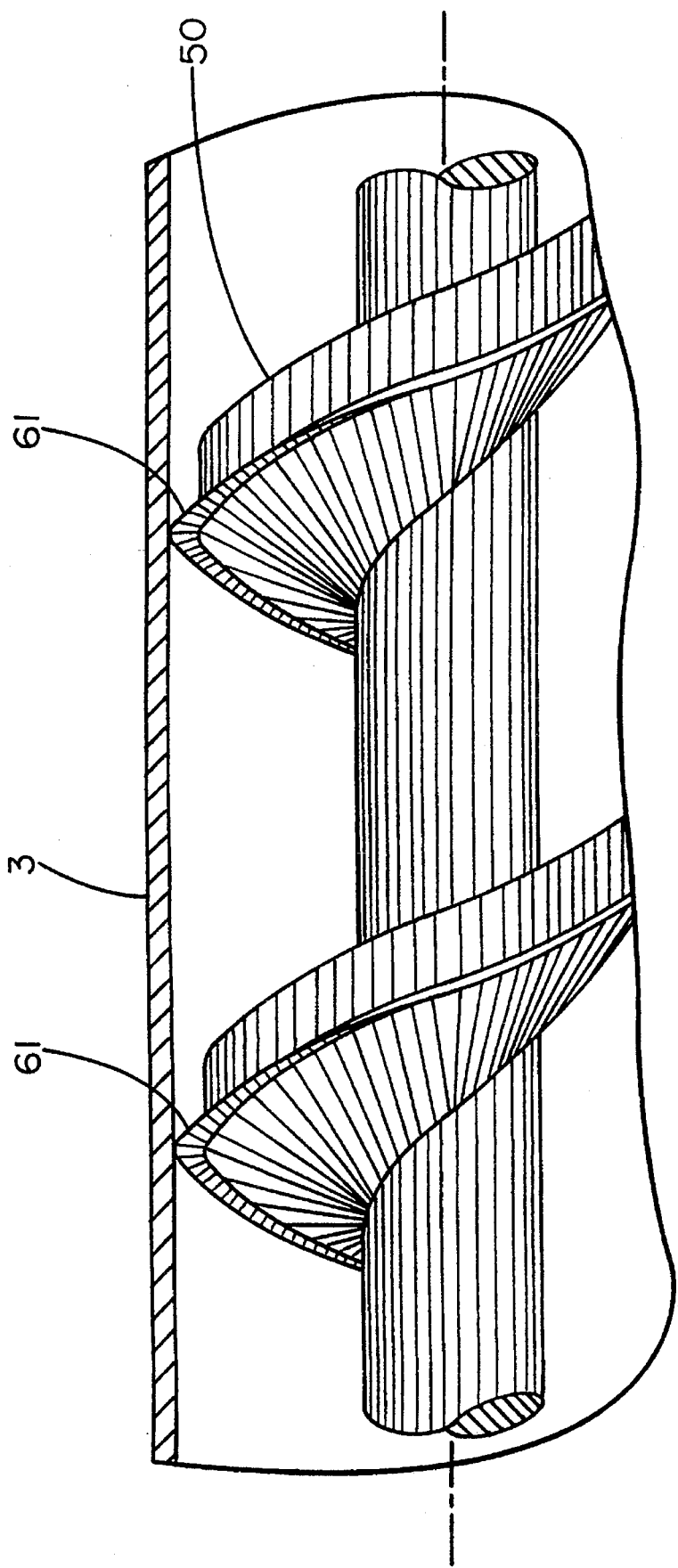
FIG. 17 is an elevational view of a portion of an auger member of a preferred embodiment of the present invention.

In the preferred embodiments of the present invention, auger blade 50 substantially contacts the inner surface of product tube 3 so as to substantially scrape the product therefrom and to substantially urge it forwardly towards the dispensing end of product tube 3. In an alternative embodiment, auger blade 50 includes a substantially flexible scraper attachment 61 extending outwardly from the outer, forward end of auger blade 50, as shown in FIG. 17. The utilization of scraper attachment 61 substantially reduces manufacturing costs by substantially eliminating very tight tolerances of auger member 40 and product tube 3. As a result, auger member 40 can be then purchased as a standardized, standalone and/or off-the-shelf part.

The preferred embodiments of the present invention preferably includes means for imparting substantially planetary motion to auger member 40 so as to thoroughly mix and/or aerate the product within product tube 3 by concurrently rotating auger member 40 about the longitudinal axis of product tube 3 as it rotates about its own longitudinal axis.

Auger member 40 and the planetary motion means provide significant improvements over conventional beating blades in conventional devices in that auger member 40 quickly mixes air with the substantially liquid product so as to produce a substantially foam-like characteristic signifying a substantial air-to-liquid ratio. Such foam-like characteristic is essential to achieve before the liquid components substantially solidify.

Such planetary motion means comprises stationary internal gear 55, auger pinion gear 58, auger connecting shaft 54, and auger pivot shafts 56, 57.

Figure 15:
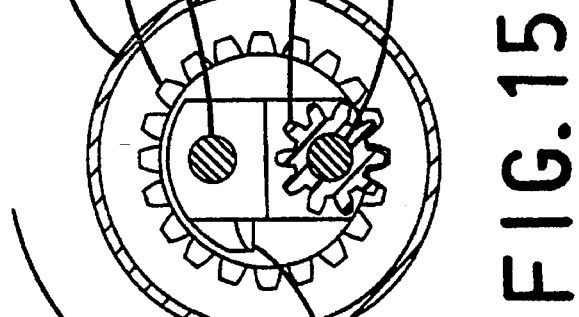
FIG. 15 is a cross sectional view of the auger member assembly of FIG. 16 taken along the 15—15 line therein.

Stationary internal gear 55 is substantially fixed substantially within one end portion of product tube 3 and includes a plurality of tooth spaces for receiving gearing teeth, as shown in FIG. 15. Auger pinion gear 58 preferably but not necessarily is attached to auger member 40 at one end thereof, so that when auger member 40 is disposed within product tube 3, the teeth of pinion gear 58 engages with the tooth spaces of stationary gear 55. In this way, as pinion gear 58 is rotated along the inner surface of stationary gear 55 in a substantially circular manner, auger member 40 is additionally rotated about its own longitudinal axis by the rotating motion of pinion gear 58 about its longitudinal axis, thus creating substantially planetary motion of auger member 40. As shown in FIG. 15, auger member 40 rotates about its own longitudinal axis in a first rotational direction while concurrently rotating about stationary gear 55 in a second rotational direction that is opposite the first rotational direction.

The diameter of stationary gear 55 and the size of auger blade 50 are calculated so that auger member 40 substantially contacts substantially the entire inner surface of product tube 3. This action assures that the product is substantially scraped from the surface of product tube 3 and is thus a significant improvement over conventional auger devices in that respect. The frequency with which auger blade 50 contacts the entire surface of product tube 3 depends in part upon the gearing ratio of stationary gear 55 to pinion gear 58. For example, if the gearing ratio of stationary gear 55 to pinion gear 58 is 2.5:1, then the entire surface of product tube 3 is scraped every 2.5 revolutions of auger member 40 about stationary gear 55. In the preferred embodiments of the invention, the surface of product tube 3 is substantially fully scraped between one and three revolutions of auger member 40. The gearing ratio between stationary gear 55 and pinion gear 58 also determines the center distance therebetween as well as the outside diameter of auger member 40.

Pinion gear 58 is preferably but not necessarily a "spur" type gear so as to reduce manufacturing costs and to facilitate easy removal of auger member 40 from product tube 3, such as for cleaning or replacement purposes. Pinion gear 58 has only one tooth which engages with stationary gear 55 at a single time, and the edges of the teeth of pinion gear 58 and stationary gear 55 are substantially chamfered so as to allow pinion gear 58 to substantially slide into engagement with stationary gear 55. The lengths and tooth thicknesses of stationary gear 55 and pinion gear 58 are sized so as to add strength to the gearing and planetary motion means.

In alternative embodiments, the gearing comprises helical gearing or bevel gearing.

The planetary motion means of the preferred embodiments of the present invention further includes auger connecting shaft 54, which is disposed in a substantially parallel relationship to auger 40 within product tube 3, as shown in FIGS. 13–16. Auger connecting shaft 54 is indirectly connected to pinion gear 58 and thus rotates about product tube 3, and adds, among other things, stability to the rotating auger assembly.

Figure 13:
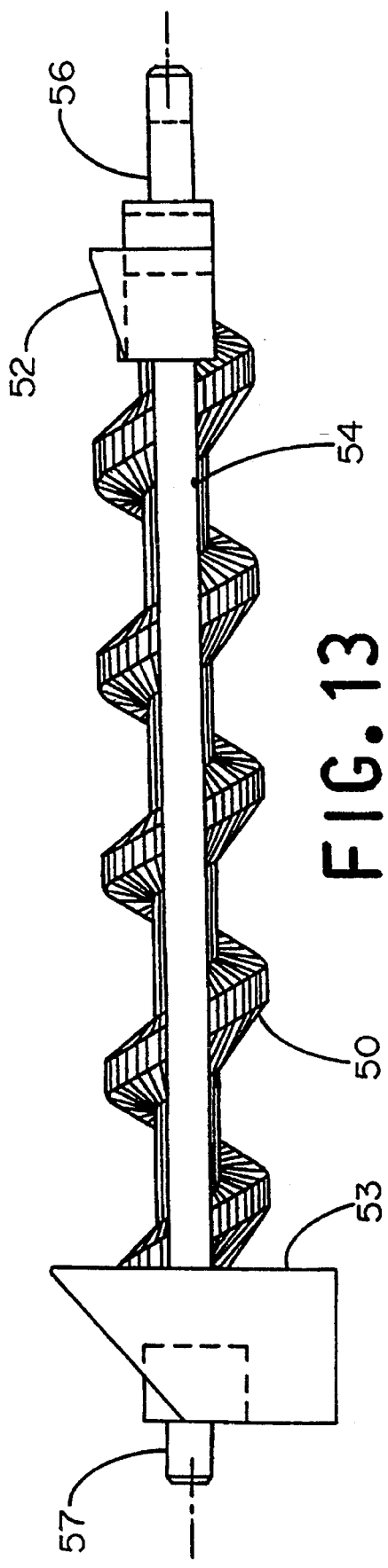
FIG. 13 is a cross sectional view of an auger member assembly of a preferred embodiment of the present invention.
Figure 14:
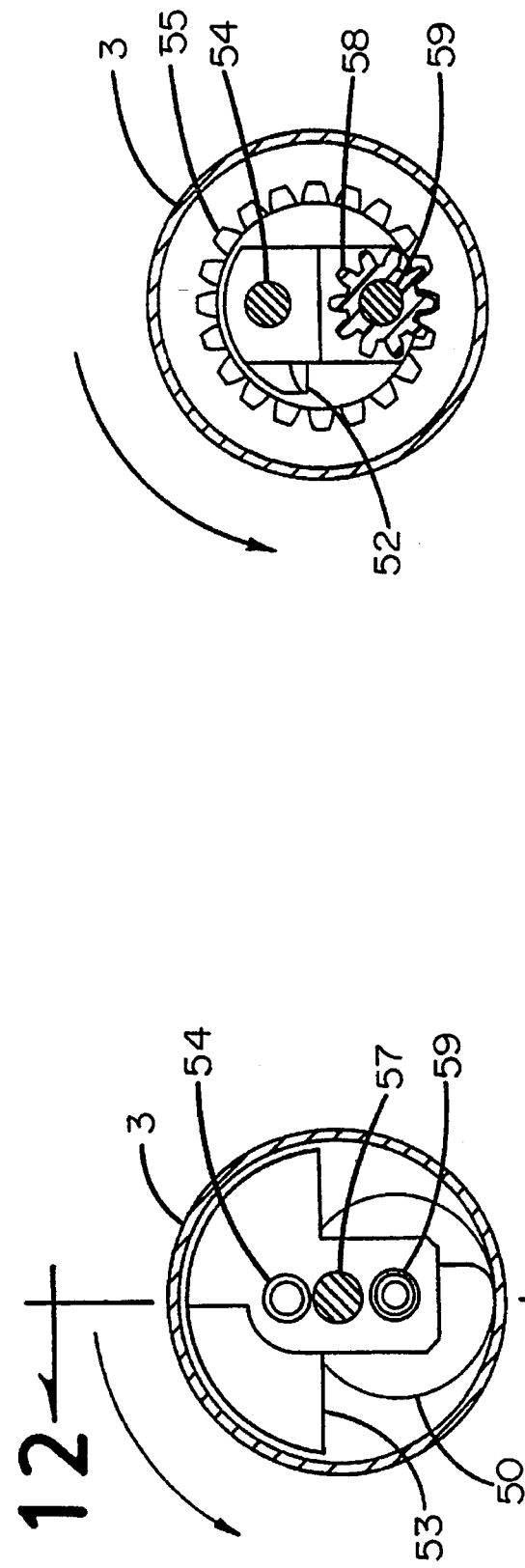
FIG. 14 is a cross sectional view of the auger member assembly of FIG. 16 taken along the 14—14 line therein.
Figure 16:
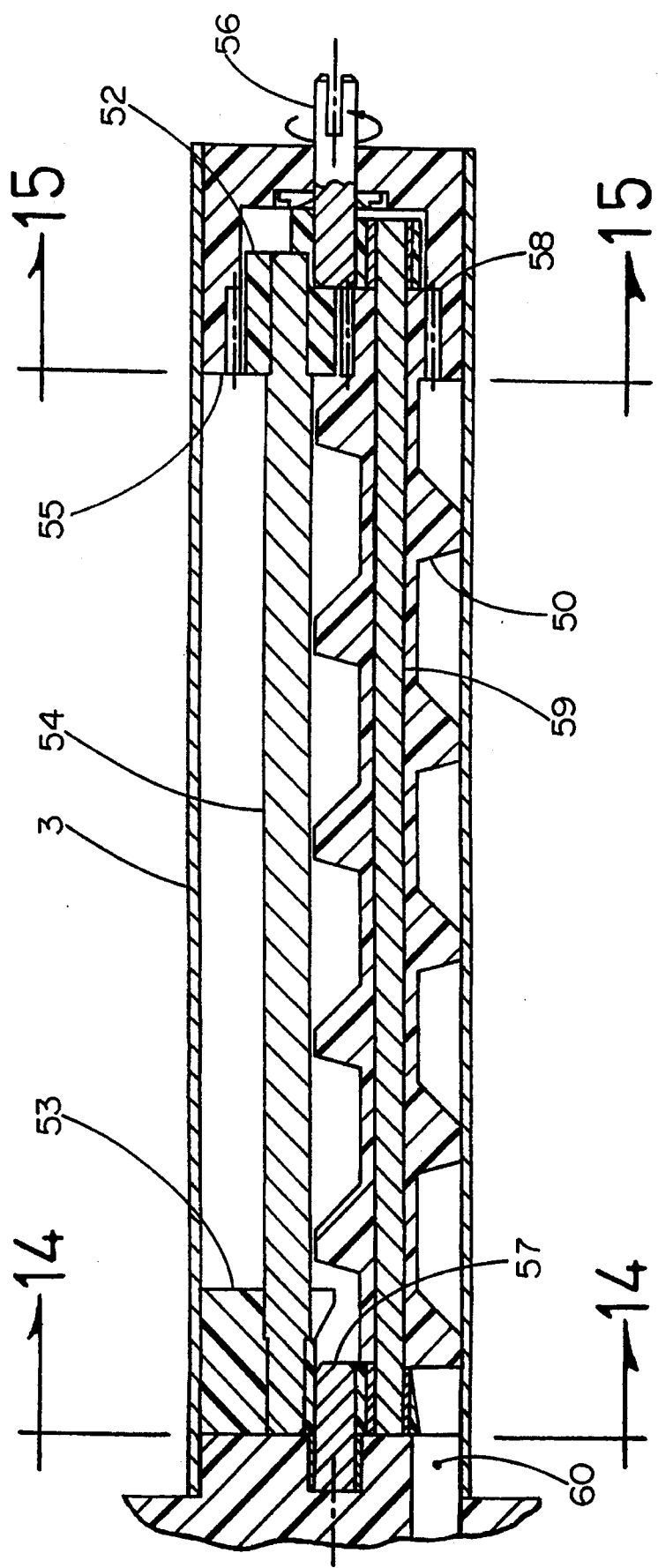
FIG. 16 is a cross sectional view of an auger member and product tube assembly according to a preferred embodiment of the present invention.

Referring to FIGS. 13, 14, and 16, the planetary motion means includes auger assembly pivot shafts 56 and 57, which are each disposed substantially within product tube 3 so as to easily rotate about their respective longitudinal axes. Pivot shafts 56 and 57 are preferably connected to auger member 40 and connecting shaft 54 at opposite ends of each (FIG. 16). A motor (not shown) is preferably but not necessarily connected to the free end of pivot shaft 56 extending outwardly from product tube 3 so that as the motor causes pivot shaft 56 to rotate about its longitudinal axis, pinion gear 58 rotates within stationary gear 55, thereby rotating auger member 40 in a substantially planetary manner. Both pivot shafts 56 and 57 preferably but not necessarily connect to bearings so as to facilitate the rotational movement of each. In a preferred embodiment, auger member 40 rotates at approximately 2.5 times the rotational speed of pivot shafts 56 and 57 in order to adequately aerate the product so as to obtain a substantially foam-like consistency substantially therethrough. As shown in FIG. 14, the diameter of auger blade 50 extends from the inner surface of product tube 3 to the central portion thereof, thereby ensuring that all of the composition in product tube 3 is thoroughly aerated and moved by auger member 40.

According to the preferred embodiments of the present invention, the auger assembly further includes means for gathering the product composition which has been substantially urged to the forward (dispensing) end of product tube 3, and for forcing it out of the dispensing means. Referring to FIGS. 13 and 16, the product gathering means comprises front scoop 53 being attached to the end portion of rotating connecting shaft 54 at the forward end of product tube 3. Front scoop 53 preferably but not necessarily substantially contacts the surface of product tube 3 and includes an angled inner edge so that as auger member 40 pushes the composition product to the forward end of product tube 3 in a first one half revolution, front scoop 53 directs the product towards product outlet port 60 and forces the product therethrough in the next one half revolution of auger member 40.

A preferred embodiment of the present invention further includes a means for efficiently directing the composition from the gearing assembly into the path of auger member 40. Such composition directing means preferably but not necessarily comprises back wedge 52, which is disposed about the rearward end of connecting shaft 54 and includes an edge or surface which contacts the inner surface of stationary gear 55 as it is rotated therein. The contacting surface or edge is preferably angled (FIG. 13) so as to direct any accumulated product from stationary gear 55 into the mixing/aerating area of product tube 3.

In an alternative embodiment of the present invention, front scoop 53 and back wedge 52 may be configured to provide multiple pushing action per revolution of the auger assembly, in order to provide for more uniform product dispensing at reduced RPM's, thereby reducing noise, wear or other fatigue of the auger assembly.

In a preferred embodiment of the present invention, the motor which rotates auger member 40 and connecting shaft 54 about stationary gear 55 preferably but not necessarily cooperates with the dispensing device which discharges the mixed product from product tube 3 via product supply outlet port 60. The dispensing device preferably includes a lever which controls the position of a plunger relative to product supply outlet port 60, through manual activation thereof. As the lever is manually activated, the auger motor is automatically activated so as to push the mixed product forwardly through product supply outlet port 60 and the dispensing device. When the lever is deactivated, the motor is likewise deactivated.

The present invention preferably but not necessarily includes circuitry to activate the motor for auger member 40 prior to compressor 8 cooling product tube 3, and to deactivate the motor after compressor 8 is deactivated. Such control circuitry thereby ensures that the auger motor and compressor 8 are not activated and/or deactivated substantially simultaneously, so as to substantially avoid complications such as power surges, etc.

In use, refrigerant is supplied under pressure from compressor 7 and condenser 8 at a preselected temperature, passes through pressure control device 4 and control valve 5, and enters manifold 2. Manifold 2 substantially evenly distributes the refrigerant to jacket member 1 and into area A formed between jacket member 1 and product tube 3 so as to substantially uniformly maintain product tube 3 at the preselected temperature. The refrigerant then exits area A through outlet port 1B and returns to compressor 7.

The ingredients for the final product are introduced to product tube 3 via product supply inlet tube 42 and are quickly and thoroughly mixed and aerated together by auger member 40. By imparting substantially planetary motion to auger member 40 and by disposing product tube 3 at an angle offset from the horizontal, the product is mixed and cooled at the preselected temperature by urging the product to the inner surface of product tube 3, scraping it therefrom, and urging it towards the forward end of product tube 3. Front scoop 53 then directs the mixed, aerated composition to product supply outlet port 60 for dispensing. The dispensing of the mixed, final product is facilitated by product tube 3 being disposed at an angle from the horizontal.

The device is thoroughly cleaned by first introducing cleaning fluid into product tube 3 via product supply inlet port 42. Auger member 40 is then selectively activated so as to create sufficient splashing action of the cleaning fluid within product tube 3. Thereafter, the cleaning fluid is easily drained from product tube 3 through product supply outlet port 60 due to product tube 3 being positioned at an angle offset from the horizontal axis. Optionally, auger member 40 is selectively disconnected from product tube 3 for separate rinsing, washing, or replacing.

Although there have been described what are at present considered to be the preferred embodiments of the present invention, it will be understood that the invention can be embodied in other specific forms without departing from the spirit or essential characteristics thereof.

For example, the composition processing device may alternatively incorporate a plurality of product tubes 3 and corresponding jacket members 1. Such an embodiment preferably but not necessarily includes a separate motor for operating each auger member 40 so as to allow for separate operation of each product tube 3 and for reducing motor wear and extensive connecting devices from a motor to a plurality of pivot shafts 56.

The described embodiments are, therefore, to be considered in all aspects as illustrative, and not restrictive. The scope of the invention is indicated by the appended claims rather than the foregoing description.

We claim:

1. A device for preparing and dispensing a food confection, comprising:

a container member for receiving confection ingredients, having a first port for receiving the ingredients and a second port for dispensing the prepared confection;

means, connected to said container member, for selectively maintaining an area defined within said container member at a preselected temperature;

means, connected to said second port of said container member, for selectively discharging the prepared confection from said second port of said container member;

an auger member disposed within said container member and having an auger blade in a substantially helical relationship with a central portion of said auger member defining a longitudinal axis thereof; and means, connected to said auger member, for rotating said auger member about its longitudinal axis in a first rotational direction while concurrently rotating said auger member about a longitudinal axis of said container member in a second rotational direction which is substantially opposite said first rotational direction.

2. A device as recited in claim 1, wherein:

said blade of said auger member having a leading surface and a trailing surface; and said leading and trailing surfaces are substantially outwardly tapered relative to said longitudinal axis of said auger member.

3. A device as recited in claim 1, wherein:

said auger rotating means includes an internal gear disposed in a substantially fixed engagement relative to said container member and having a plurality of recesses along an inner surface thereof, and a pinion gear disposed about said central portion of said auger member at a first end portion thereof so as to movably engage with said recesses of said internal gear.

4. A device as recited in claim 1, wherein:

a longitudinal axis of said container member is disposed between approximately three and five degrees from a horizontal axis; and said first port of said container being positioned at an elevated position relative to said second port thereof.

5. A device as recited in claim 2, wherein:

said auger member blade is substantially rigid; and said blade of said auger member includes a substantially flexible edge extending outwardly therefrom so as to scrape the confection from the inner surface of said container member.

6. A device as recited in claim 3, further including:

means for substantially gathering the food confection within said container member and forcing it out said second port thereof;

a shaft member which is disposed substantially in parallel to said auger member and which is connected to said rotating means to rotate about said longitudinal axis of said container member in said second rotational direction; and wherein said gathering means is connected to said shaft member so as to rotate about said longitudinal axis of said container member.

7. A device as recited in claim 3, further including:

means for directing the food confection from said internal gear towards a central portion of said container member;

a shaft member which is disposed substantially in parallel to said auger member and which is connected to said rotating means to rotate about said longitudinal axis of said container member in said second rotational direction; and wherein said food confection directing means is connected to said shaft member so as to rotate about said longitudinal axis of said container member.

8. A device as recited in claim 3, wherein:

said internal gear is substantially adjacent said first port of said container member so that the ingredients pass therethrough.

9. A device as recited in claim 1, wherein:

said auger member extends laterally from an inner surface of said container member to a center thereof.

10. A device for preparing and dispensing a food confection, comprising:

a container member for receiving confection ingredients, having a first port for receiving the ingredients and a second port for dispensing the prepared confection;

means, connected to said container member, for selectively maintaining an area defined within said container member at a preselected temperature;

means, connected to said second port of said container member, for selectively discharging the prepared confection from said second port of said container member;

an auger member disposed within said container member and having an auger blade in a substantially helical relationship with a central portion of said auger member defining a longitudinal axis thereof;

means, connected to said auger member, for imparting motion to said auger member so that said motion causes an edge portion of said auger blade to contact substantially an entire inner surface of said container member, said motion of said auger causing the ingredients within said container member to be substantially aerated and mixed to form the confection;

said auger motion means provides substantially planetary motion to said auger member relative to a longitudinal axis of said container member; and said auger motion means includes an internal gear disposed in a substantially fixed engagement relative to said container member and having a plurality of recesses along an inner surface thereof, and a pinion gear disposed about said central portion of said auger member at a first end portion thereof so as to movably engage with said recesses of said internal gear.

* * * * *